United States Patent Office 3,562,268
Patented Feb. 9, 1971

3,562,268
3-MORPHOLINO- AND 3-PIPERAZINO-1,2,8,9-TETRAAZAPHENALENES
Karl J. Doebel, Ossining, and John E. Francis, Pleasantville, N.Y., assignors to Geigy Chemical Corporation, Ardsley, N.Y., a corporation of New York
No Drawing. Continuation-in-part of application Ser. No. 718,227, Apr. 2, 1968, which is a continuation-in-part of applications Ser. No. 445,762, Apr. 5, 1965; Ser. No. 539,303, Apr. 1, 1966; and Ser. No. 583,980, Oct. 3, 1966. This application Mar. 24, 1969, Ser. No. 810,005
Int. Cl. C07d 51/02
U.S. Cl. 260—247.5
20 Claims

ABSTRACT OF THE DISCLOSURE 3-morpholino- and 3-piperazino-1,2,8,9-tetraazaphenalenes, optionally substituted in the 4,5,6,7 and/or 9 positions and their salts are cardiovascular agents and can be prepared from the corresponding 1,2,8,9-tetraazaphenalenes. A representative embodiment is 3-N-(2,6-dimethylmorpholino)-9-methyl-1,2,8,9-tetraazaphenalene.

CROSS REFERENCE

This is a continuation-in-part of copending application Ser. No. 718,227 filed Apr. 2, 1968 which in turn is a continuation-in-part of Ser. Nos. 583,980, 539,303 and 445,762 filed Oct. 3, 1966, Apr. 1, 1966 and Apr. 5, 1965 respectively, all now abandoned, Ser. No. 539,303 being a continuation-in-part of Ser. No. 445,762 and Ser. No. 583,980 being a continuation-in-part of Ser. Nos. 539,303 and 445,762.

DETAILED DESCRIPTION

The present invention pertains to 1,2,8,9-tetraazaphenalenes of the formula:

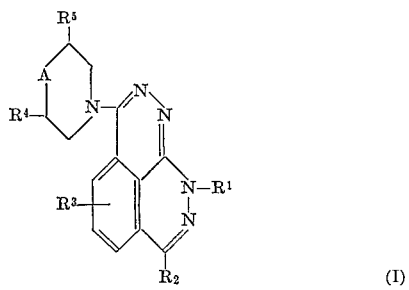

wherein:
$R^1$ is hydrogen, (lower)alkyl, phenyl or phenyl(lower)alkyl;
$R^2$ is hydrogen or phenyl;
$R^3$ is hydrogen, chloro, bromo, hydroxy (lower)alkoxy, carboxy or nitro;
each of $R^4$ and $R^5$, taken separately, is hydrogen or (lower)alkyl; and
A is O, NH, or N-alkyl, and to the non-toxic pharmaceutically acceptable acid addition salts thereof.

The term "alkyl" and derivations thereof such as "alkoxy" denotes a straight or branched hydrocarbon chain. When qualified by the designation "(lower)," such chain will contain up to and including 6 carbon atoms. Illustrative of such alkyl groups are methyl, ethyl, propyl, isopropyl, butyl, sec-butyl, t-butyl, pentyl, hexyl, and the like, while illustrative of such alkoxy groups are methoxy, ethoxy, propoxy, butoxy and the like.

The compounds of the present invention are identified herein as derivatives of the novel parent tricyclic nucleus 1,2,8,9-tetraazaphenalene which is assigned the following numbering.

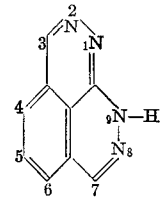

The 3-morpholino- and 3-piperazino-1,2,8,9-tetraazaphenalenes of the instant invention are cardiovascular agents, in particular, blood pressure lowering agents and are used in counteracting hypertension. They also manifest coronary and peripheral vascular dilation properties, effects on the central nervous system and anti-inflammatory activity.

These compounds can be administered parenterally or orally in any of the usual pharmaceutical forms including tablets, capsules, powders, suspensions, solutions, syrups and the like, including sustained release preparations which can be compounded by any of the known procedures.

The 3-morpholino- and 3-piperazino-1,2,8,9-tetraazaphenalenes of the present invention are prepared through treatment of a 3-chloro- or 3-bromo-1,2,8,9-tetraazaphenalene of Formula II with the appropriate amine.

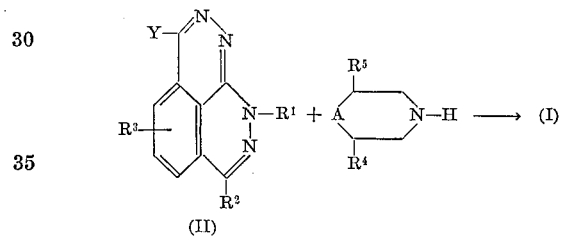

In the above Y is chloro or bromo and $R^1$, $R^2$, $R^3$, $R^4$ and $R^5$ are as previously defined.

The reaction is executed by simply heating a mixture of the reactants optionally in an inert organic solvent such as methyl Cellosolve, diglyme, triglyme or the like. Generally excess amine is employed, and in the case of lower boiling amines, increased pressure may be utilized.

The valuable 3-chloro and 3-bromo-1,2,8,9-tetraazaphenalenes of Formula II can be prepared by several routes. In one method a 3-keto-2,3-dihydro-1,2,8,9-tetraazaphenalene is treated with an excess phosphorus oxychloride or phosphorus pentachloride and phosphorus oxychloride or phosphorus oxybromide or phosphorus pentabromide and phosphorus oxybromide at elevated temperatures, e.g., at reflux, until a chloro or bromo group is introduced in the 3-position. This transformation may be represented as follows:

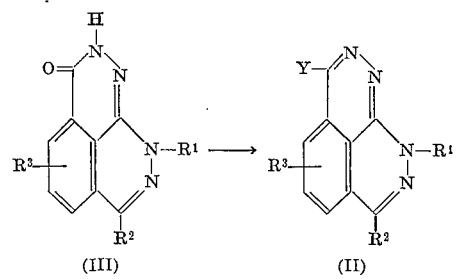

Alternatively, the 3-chloro and 3-bromo-1,2,8,9-tetraazaphenalene compounds of Formula II can be prepared from the corresponding 3-unsubstituted 1,2,8,9-tetraazaphenalenes through the action of chlorine or bromine in the presence of sodium acetate.

The above mentioned 3-keto-2,3-dihydro-1,2,8,9-tetraazaphenalenes and 3-unsubstituted-1,2,8,9-tetraazaphenalenes are the subject of copending applications filed herewith. Briefly one preparation of such compounds involves the following:

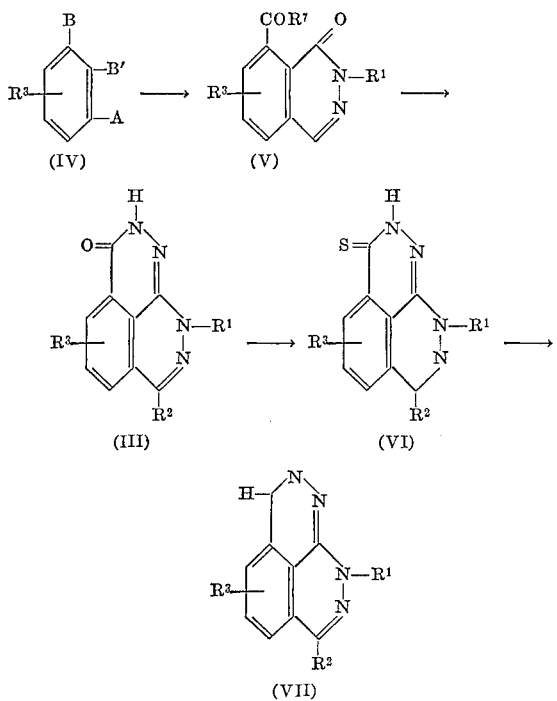

With greater particularity to the above reaction scheme, the starting material is a compound of Formula IV wherein $R^3$ is as previously defined, A is dibromomethyl, an aldehyde group, or benzoyl and each of B and B' is a carboxyl group or a group the oxidative state of which corresponds to that of a carboxyl group, including acid halides, anhydrides, esters and lactones thereof. Representative compounds of Formula IV thus include 3-dibromomethylphthalic anhydride, 3 - hydroxy - 7-carboxyphthalide, 2-dibromomethyl-6-carbethoxybenzoic acid. A compound of Formula IV is then treated with a single molar equivalent of a hydrazine to yield the substituted 1(2H)phthalazinone of Formula V wherein $R^7$ is hydroxy. This, or the corresponding derivative wherein $R^7$ is alkoxy, chloro or bromo, when treated with hydrazine, yields the 3-keto-2,3-dihydro-1,2,8,9-tetraazaphenalene of Formula III which is converted directly to the 3-chloro- or 3-bromo-1,2,8,9-tetraazaphenalene of Formula II as previously described. Alternatively the keto compound of Formula III is treated with phosphorus pentasulfide in, for example, refluxing pyridine to yield the corresponding 3 - thiono-2,3-dihydro-1,2,8,9-tetraazaphenalene of Formula VI. This thiono compound is then treated with Raney nickel in an inert organic solvent such as methyl Cellosolve to yield the corresponding 3-substituted 1,2,8,9-tetraazaphenalenes of Formula VII.

Included within the scope of the present invention are the acid addition salts of these novel tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the scope of this invention.

The following examples, presented for illustration and not limitation, will serve to further typify the nature of the present invention. In these examples temperature is expressed in degrees centigrade.

EXAMPLE 1

3-chloro-9-phenyl-1,2,8,9-tetraazaphenalene (a) 3-dibromomethylphthalic anhydride.—A mixture of 3-methylphthalic anhydride (81 g.), N-bromosuccinimide (182 g.), benzoyl peroxide (40 mg.) and carbon tetrachloride (1500 ml.) is irradiated and heated ti reflux by a 100 watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, M.P. 90.5–93° C. in 72% yield. Two recrystallizations from ether-hexane yield colorless needles melting at 93–95° C.

Calcd. for $C_9H_4Br_2O_3$ (percent): C, 33.78; H, 1.26; Br, 49.92. Found (percent): C, 33.66; H, 1.20; Br, 49.41.

(b) 3-hydroxy-7-carboxyphthalide.—3-dibromomethylphthalic anhydride (40 g.) is added in small portions to a hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is dissolved in hot water (600 ml.), treated with decolorizing charcoal and filtered.

After three days at 5° C., the colorless filtrate yields 21.3 g. (88%) of colorless blocks, M.P. 163.5–166° C. The analytical sample, M.P. 165.5–168.5° C., is obtained after two further crystallizations from water.

Calcd. for $C_9H_6O_5$ (percent): C, 55.68; H, 3.12. Found (percent): C, 55.98; H, 2.99.

(c) 8 - carboxy-2-phenyl-1(2H) - phthalazinone.—A mixture of phenylhydrazine (3.6 ml.), 3-hydroxy-7-carboxyphthalide (5.82 g.) and glacial acetic acid (100 ml.) is heated under reflux for 18 hours. The clear solution is evaporated to dryness in vacuo and the residual solid triturated with methanol and collected. The product (6.97 g.), M.P. 197–199°, is recrystallized from benzene and a colorless crystalline product, M.P. 197–198° obtained.

Calcd. for $C_{15}H_{10}N_2O_3$ (percent): C, 67.66; H, 3.79; N, 10.52. Found (percent): C, 67.28; H, 3.75; N, 10.82.

The infrared spectrum (Nujol) shows prominent peaks at 1720 cm.$^{-1}$ (carboxyl group) and 1650 cm.$^{-1}$ (amide carbonyl).

(d) 8 - carbethoxy - 2 - phenyl-1(2H)phthalazinone.— To a solution of thionyl chloride (40 ml.) in chlorobenzene (150 ml.) is added under stirring 8-carboxy-2-phenyl - 1(2H)phthalazinone (24.3 g.) and the mixture heated at reflux with exclusion of moisture for 2 hours. When the evolution of gas has ceased, the solution is evaporated to dryness in vacuo. The residual white solid (24.7 g.) is treated with absolute ethanol (350 ml.) and heated under reflux for 18 hours. The solution is filtered hot and allowed to cool slowly. The ester precipitates in colorless needles, M.P. 150–151°. The melting point is unchanged after recrystallization from ethanol.

Calcd. for $C_{17}H_{14}N_2O_3$ (percent): C, 69.37; H, 4.79; N, 9.52. Found (percent): C, 69.08; H, 4.65; N, 9.36.

(e) 3 - keto-9-phenyl-2,3-dihydro - 1,2,8,9 - tetraazaphenalene.—A mixture of 2-phenyl-8-carbethoxy-1(2H) phthalazinone (11.76 g.), 100% hydrazine hydrate (40 ml.) and methyl Cellosolve (160 ml.) is heated at reflux for 25 hours. The yellow solution is filtered and treated with methanol (100 ml.) followed by water dropwise under stirring. A flocculent yellow precipitate forms. The mixture is cooled and the product collected, washed thoroughly with water and ethanol and dried in vacuo. The solid (4.44 g.) M.P. 254–6°, is recrystallized from methyl Cellosolve and obtained as yellow needles, M.P. 255–7°.

Calcd. for $C_{15}H_{10}N_4O$ (percent): C, 68.70; H, 3.85; N, 21.37. Found (percent): C, 68.81; H, 3.90; N, 21.20.

(f) 3-chloro-9-phenyl - 1,2,8,9-tetraazaphenalene.—To a stirred mixture of phosphorus pentachloride (6.3 g.) in phosphorus oxychloride (40 ml.) is added finely powdered 3 - keto - 9 - phenyl-2,3-dihydro-1,2,8,9-tetraazaphenalene (7.8 g.). The mixture is stirred at reflux for 165 minutes under moisture exclusion and then poured cautiously into ice. The mixture is made alkaline under cooling with 20% sodium hydroxide solution and the fine yellow precipitate which forms is collected and washed with water. As this material still contains inorganic solid, it is stirred for ½ hour in 600 ml. of warm (50°) water and again filtered. The precipitate is recrystallized from ethanol and 5.4 g. of yellow crystals, M.P. 225–228°, obtained.

EXAMPLE 2

3-chloro-9-methyl-1,2,8,9-tetraazaphenalene (a) 3-keto - 2,3 - dihydro-1,2,8,9-tetraazaphenalene.— A suspension of α,α-dibromo-3-methylphthalic anhydride (80 g.) in ethanol (500 cc.) is treated with a solution of 100% hydrazine hydrate (100 cc.) and water (100 cc.) dropwise under stirring and cooling. A white suspension forms. After the addition, the temperature is raised gradually to reflux, whereupon the white suspension disappears and a yellow precipitate forms. After 88 hours at reflux, the mixture is cooled, filtered and the first crop of product is washed with water and ethanol and dried in vacuo, dissolved in 500 ml. of glacial acetic acid and heated under reflux for 18 hours. The mixture is cooled and filtered and a second crop of the product obtained. The overall yield of product, M.P. >347°, is 25.7 g., or 55% of theory. The product is recrystallized from 3 liters of boiling dimethylformamide and obtained as a yellow powder which, on heating, forms a microcrystalline solid at 220–270° C. and melts above 350° C.

Calcd. (percent): C, 58.06; H, 3.25; N, 30.09. Found (percent): C, 57.92, 58.03; H, 3.58, 3.52; N, 30.28.

(b) 3-keto-9-methyl-2,3-dihydro-1,2,8,9-tetraazaphenalene.—To a stirred suspension of sodium methoxide (0.7 g.) in dry dimethylsulfoxide (100 ml.) is added 3-keto-2,3-dihydro-1,2,8,9-tetraazaphenalene (1.86 g.). This is stirred at 60° under moisture exclusion until a red solution has formed. This is cooled to 50° C. and methyliodide (1 ml.) is added. The solution darkens, and after 20 minutes, more methyliodide (1 ml.) is added and the solution is poured into ice water (500 ml.) containing 0.5 g. of sodium bisulfite and 4 ml. of glacial acetic acid. The mixture is cooled overnight and then filtered. The product is collected by filtration, washed with water and dried. The yellow solid (1.2 g.) is twice recrystallized from methyl Cellosolve and clarified with charcoal, to yield the product, M.P. 289–293°.

(c) 3-chloro-9-methyl-1,2,8,9-tetraazaphenalene.—To a stirred mixture of phosphorus pentachloride (11.25 g.) in phosphorus oxychloride (90 ml.) is added 3-keto-9-methyl-2,3-dihydro-1,2,8,9-tetraazaphenalene. This mixture is stirred at reflux under moisture exclusion for 2 hours and then poured into ice and rendered basic under stirring and cooling with 20% sodium hydroxide solution. The yellow solid is collected, washed thoroughly with water and dried in a dessicator over phosphorus pentoxide. The product (8.63 g.) is recrystallized twice from ethanol with clarification over charcoal to yield 4.75 g. of product, M.P. 253–255° (dec.).

In a similar fashion to that described in part (c) of this example, 3-keto-2,3-dihydro-1,2,8,9-tetraazaphenalene is converted to 3-chloro-1,2,8,9-tetraazaphenalene which as the methanesulfonate salt melts at 246–249° (dec.).

EXAMPLE 3

3-chloro-7-phenyl-1,2,8,9-tetraazaphenalene (a) 8-carboxy-4-phenyl-1(2H)phthalazinone.—A mixture of 32.5 g. of 3-benzoylphthalic acid and 85 ml. of hydrazine hydrate in 145 ml. of water is heated at reflux for 18 hours. Upon cooling and acidification with hydrochloric acid, the product forms as a solid. This is collected and recrystallized from glacial acetic acid, M.P. 257–259°.

(b) 8-carbomethoxy-4-phenyl - 1(2H)phthalazinone.— The product of part (a) (19.0 g.), 32 ml. of thionyl chloride and 115 ml. of chlorobenzene is heated at reflux with stirring and exclusion of moisture for 3 hours. The solid obtained upon concentration under reduced pressure is taken up in 300 ml. of methanol and this solution is then heated at reflux for 18 hours. Upon cooling the product, M.P. 198–202°, is collected and can be used directly in the next step.

(c) 3-keto-7-phenyl-2,3-dihydro-1,2,8,9-tetraazaphenalene.—A mixture of 18.6 g. of 8-carbomethoxy-4-phenyl-1(2H)phthalazinone, 400 ml. of hydrazine hydrate and 100 ml. of water is heated at reflux for 20 hours. The solid which forms upon cooling is collected, washed with water and recrystallized from methyl Cellosolve, M.P. over 350° C.

(d) 3-chloro-7-phenyl - 1,2,8,9 - tetraazaphenalene.—A mixture of 3-keto-7-phenyl-2,3-dihydro-1,2,8,9-tetraazaphenalene (5 g.), phosphoryl chloride (27 ml.) and phosphorus pentachloride (4 g.) is heated at reflux under moisture exclusion. The mixture is then concentrated under reduced pressure, taken up in acetone and quenched in ice-water. The solid product is collected, washed with cold water and dried, M.P. 277–288° C.

EXAMPLE 4

3-chloro-9-benzyl-1,2,8,9-tetraazaphenalene

A mixture of 3-keto-5-benzyl-2,3-dihydro-1,2,8,9-tetraazaphenalene (47 g.), phosphorus oxychloride (340 ml.) and phosphorus pentachloride (43 g.) is heated at reflux with exclusion of moisture for 1½ hours. The reaction mixture is then evaporated to dryness at reduced pressure and the residue taken up in acetone. This acetone solution is poured into ice water with stirring and the resultant mixture is rendered basic with 20% sodium hydroxide solution and extracted with chloroform. The chloroform extracts are washed with water, dried over sodium sulfate and concentrated to dryness at reduced pressure to yield the product which is purified through recrystallization from a mixture of methyl Cellosolve and ethanol, M.P. 203.5–207.5°.

Further purification may be effected through passage of a chloroform solution of the product over neutral alumina followed by recrystallization from benzene, M.P. 208–209°.

EXAMPLE 5

3-bromo-9-methyl-1,2,8,9-tetraazaphenalene (a) 9 - methyl - 1,2,8,9 - tetraazaphenalene.—3-keto-9-methyl-2,3-dihydro-1,2,8,9-tetraazaphenalene (9.0 g.) in 120 ml. of dry pyridine and 12 g. phosphorus pentasulfide are mixed with stirring and refluxed for 2.5 hours. The mixture is poured into an ice-salt mixture, stirred for 30 minutes and filtered. The solid thus collected is dried and recrystallized from methyl Cellosolve to yield 3-thiono-9-methyl-2,3-dihydro-1,2,8,9-tetraazaphenalene, M.P. 299–316° C.

3-thiono-9-methyl-2,3-dihydro-1,2,8,9-tetraazaphenalene (1.08 g.) is suspended in ethanol (200 ml.) and treated with Raney nickel (about 5 g.) in ethanol added in several portions. After the addition is complete, the mixture is stirred for one hour on the steam bath and then filtered hot. The filtrate is evaporated in vacuo, taken up in ethanol and again filtered. Evaporation of the ethanol solution yields a yellow solid (0.60 g.). The product is purified by one recrystallization from benzenehexane. Yellow crystals (0.40 g.) are obtained melting in the range of 145–147°.

Calcd. for $C_{10}H_8N_4$ (percent): C, 65.20; H, 4.38; N, 30.42. Found (percent): C, 65.03; H, 4.59; N, 30.15.

(b) 3-bromo-9-methyl-1,2,8,9-tetraazaphenalene.—To a solution of 9-methyl-1,2,8,9-tetraazaphenalene (368 mg.) and 165 mg. of anhydrous sodium acetate in 25 ml. of glacial acetic acid are added in a dropwise fashion with stirring 320 mg. of bromine in 25 ml. of glacial acetic acid. The mixture is stirred for 18 hours and then poured into water, filtered and recrystallized from ethanol to yield the product, M.P. 237–238°.

Calcd. for $C_{10}H_7N_4Br$ (percent): C, 45.65; H, 2.68; N, 21.29. Found (percent): C, 45.30; H, 2.57; N, 21.54.

EXAMPLE 6

3-N-morpholino-1,2,8,9-tetraazaphenalene

To a mixture of 3-keto-2,3,-dihydro-1,2,8,9-tetraazaphenalene (9.3 g.) and water (10 drops) is added phosphoryl chloride (60 ml.) and the mixture heated 20 hours at reflux. The dark solution is evaporated in vacuo to a brown foam. The foam is triturated with ethanol and the resulting 3-chloro-1,2,8,9-tetraazaphenalene as yellow solid is collected and dried in vacuo. This intermediate (12.05 g.) can be further purified or can be suspended in morpholine (100 ml.) and heated for 48 hours at reflux. The resulting dark solution is poured into ice-water. The yellow precipitate which forms is collected, dried and triturated with chloroform (~500 ml.). The chloroform mixture is filtered free of 4.0 g. of impurity and evaporated to dryness in vacuo. The residual solid (~9 g.) is purified by recrystallization from ethanol, M.P. 277–280°.

EXAMPLE 7

3-N-morpholino-9-methyl-1,2,8,9-tetraazaphenalene

A mixture of 3-bromo-9-methyl-1,2,8,9-tetraazaphenalene (50 mg.), morpholine (1 ml.) and methyl Cellosolve (5 ml.) is heated at reflux for 20 hours. The solution is concentrated to a solid residue at reduced pressure and the residue triturated with water and filtered. The product is dissolved in dilute hydrochloric acid, filtered and the filtrate rendered basic with sodium carbonate. The product precipitates from solution and is recrystallized from water, M.P. 219–220°.

Alternatively, a mixture of morpholine (100 ml.) and 3-chloro-9-methyl-1,2,8,9-tetraazaphenalene (10.95 g., 0.05 mole) is heated under reflux for 22 hours. The morpholine is removed by evaporation in vacuo and the yellow residue triturated with water, filtered and recrystallized twice from ethanol, M.P. 219–222°.

The methane sulfonate salt melts at 233–235°.

EXAMPLE 8

3-(N-morpholino)-9-phenyl-1,2,8,9-tetraazaphenalene

A mixture of morpholine (75 ml.) and 3-chloro-9-phenyl-1,2,8,9-tetraazaphenalene (6 g.) is stirred at reflux for 24 hours under moisture exclusion and then poured into ice-water. The yellow precipitate which forms is collected, washed with water and dried in vacuo. The crude product (M.P. 249–253°) is recrystallized once from aqueous ethanol and once from chloroform-ether, whereupon 4.2 g. of yellow crystals are obtained, M.P. 268–269°.

EXAMPLE 9

3-N-(2,6-dimethylmorpholino)-9-methyl-1,2,8,9-tetraazaphenalene methane sulfonate A mixture of 2,6-dimethylmorpholine (35 ml.), 3-chloro-9-methyl-1,2,8,9-tetraazaphenalene (10.95 g.), and methyl Cellosolve (100 ml.) is stirred at reflux for 22 hours. The solution is concentrated to dryness and the residue triturated with water and filtered. The precipitate is taken up in hot benzene and the residual water in the material removed by azeotropic distillation. Evaporation of the benzene yields 3-N-(2,6-dimethylmorpholino)-9-methyl-1,2,8,9-tetraazaphenalene, M.P. 169–172°.

Six grams of this free base are dissolved in methanol (510 ml.) and methanesulfonic acid (3.5 ml.) is added. The product formed upon addition of ether to the solution is collected and recrystallized from methanol-ether to give the product, M.P. 272–274°.

Calcd. for $C_{17}H_{23}N_5O_4S$ (percent): C, 51.89; H, 5.89; N, 17.81; S, 8.14. Found (percent): C, 51.95; H, 5.87; N, 17.84; S, 8.29.

EXAMPLE 10

3-(2,6-dimethylmorpholino)-9-benzyl-1,2,8,9-tetraazaphenalene

A mixture of 3-chloro-9-benzyl-1,2,8,9-tetraazaphenalene (17.8 g.) and 2,6-dimethylmorpholine (150 ml.) is heated at reflux for 18 hours, cooled and added under stirring to ice-water. The yellow precipitate which forms is collected, washed with water and dried. The solid is dissolved in chloroform, washed with water and the chloroform layer dried over sodium sulphate and evaporated to dryness at reduced pressure. The product, a yellow crystalline solid, may be further purified by dissolution in ethyl acetate and elution through a column of neutral aluminum oxide, after which the product is in the form of yellow crystals, M.P. 192–200°. Alternatively, it may be taken up in methanol (50 ml.) and treated with methanesulphonic acid (4 ml.). The resulting solution is treated with dry ether, whereupon 3-(2,6-dimethylmorpholino)-9-benzyl - 1,2,8,9 - tetraazaphenalene methane sulphonate crystallizes from solution. The yellow crystalline product, after two recrystallizations from methanol-ether, melts at 197–199°.

EXAMPLE 11

3-(2,6-dimethylmorpholino)-9-phenyl-1,2,8,9-tetraazaphenalene

A mixture of 2,6-dimethylmorpholine (150 ml.) and 3-chloro-9-phenyl-1,2,8,9-tetraazaphenalene (11.2 g.) is stirred at reflux for 18 hours, cooled and poured into ice-water. The yellow solid which separates is collected, washed with water and dried. The product, after recrystallization from methanol, melts in the range 227 to 231°.

The free base is dissolved in methanol and treated with methanesulphonic acid (1.5 ml.). The solution is cooled and treated with dry ether, whereupon the yellow methane-sulphonate salt crystallizes. After three recrystallizations from methanol-ether, the methane sulphonate salt of 3-(2,6-dimethylmorpholino)-9-phenyl-1,2,8,9-tetraazaphenalene melts at 193.5 to 196.5°.

In a similar fashion, the use of 3-chloro-7-phenyl-1,2,8,9-tetraazaphenalene yields 3-(2,6-dimethylmorpholino)-7-phenyl-1,2,8,9-tetraazaphenalene.

EXAMPLE 12

3-(2,6-dimethylmorpholino)-1,2,8,9-tetraazaphenalene

By substituting 3-chloro-1,2,8,9-tetraazaphenalene for 3-chloro-9-methyl-tetraazaphenalene in the procedure of Example 9, there is obtained 3-(2,6-dimethylmorpholino)-1,2,8,9-tetraazaphenalene, M.P. 210–213°. Treatment of the free base in absolute methanol with methanesulfonic acid yields the methanesulfonate, M.P. 253–255°.

EXAMPLE 13

3-N-(4-methylpiperazinyl)-9-methyl-1,2,8,9-tetraazaphenalene

A mixture of 3-chloro-9-methyl-1,2,8,9-tetraazaphenalene (10 g.) and 4-methyl-piperazine (50 ml.) is stirred at reflux for 24 hours. The solution is then poured into cold ether. The product collected upon filtration is taken up in hot benzene, treated with charcoal and filtered. The benzene solution is evaporated at reduced pressure to a yellow solid which is dissolved in methanol saturated with hydrogen chloride. Addition of dry ether precipitates the product as the hydrochloride salt, M.P. 293–304° (dec.).

EXAMPLE 14

3-(4-methylpiperazino)-1,2,8,9-tetraazaphenalene

A mixture of 3-chloro-1,2,8,9-tetraazaphenalene hydrochloride (24.1 g.), N-methylpiperazine (40 ml.) and methyl Cellosolve (200 ml.) is heated at reflux for 20 hours, cooled and evaporated to dryness at reduced pressure. The residual material is triturated with ethanol and the solid collected and dried. It is then dissolved as well as possible in chloroform (600 ml.), filtered free of any residual solid and evaporated to dryness. The residual solid is triturated with ether and collected. This product may be further purified by recrystallization from ethanol, whereupon it melts in the range 252 to 254°, with decomposition.

EXAMPLE 15

3-(2,6-dimethylmorpholino)-1,2,8,9-tetraazaphenalene

A mixture of 3-chloro-1,2,8,9-tetraazaphenalene (8 g.), 2,6-diethylmorpholine (6 g.) and methyl Cellosolve (100 ml.) is stirred at reflux for 42 hours until a solution is formed. The solution is evaporated to dryness under vacuum and the oily residue triturated with water (250 ml.) with cooling. The reddish-brown solid which forms is collected by filtration, washed with water and dried. The solid is dissolved as well as possible in chloroform, filtered and the chloroform solution concentrated to dryness under vacuum. The product is chromatographed on Woelm basic alumina, grade I, (30.0 g.) with 5:1 benzene: dimethylformamide as eluent. The second and third 500 ml. fractions are collected and evaporated to yield a yellow solid, which is triturated with cold methanol, collected by filtration, washed with ether and dried to yield the free base, M.P. 195–204°.

The free base (2.15 g.) is dissolved in warm methanol (50 ml.) and treated with methanesulfonic acid (700 mg.). The mixture is heated for 15 minutes at reflux, filtered hot and allowed to cool. The product is collected by filtration, washed with a little methanol and dried to yield the methanesulfonate salt, M.P. 238–241° (dec.).

EXAMPLE 16

3-(2-methyl-6-ethylmorpholino)-1,2,8,9-tetraazaphenalenes (a) N-(2-hydroxypropyl)-1-amino-2-hydroxybutane.—A mixture of 1-amino-2-butanol (148 g.) in water (250 ml.) is treated dropwise under ice-cooling and stirring with propylene oxide (29 g.) so that the temperature remains between 0 and 5°. When the addition is complete, the bath is removed. The mixture is stirred overnight at ambient temperature and then evaporated under reduced pressure. The oily residue is distilled to yield the diol intermediates 115–116°/2 mm., $n_D > 1.71$.

(b) 2-methyl-6-ethylmorpholine.—The above diol (61.8 g.) is added dropwise with stirring to concentrated sulfuric acid over a ninety minute period at such a rate that the temperature remains below 80°. The mixture is heated at an external temperature of 200° for an additional ninety minutes, cooled and poured into 500 ml. of ice-water. The mixture is filtered and the filtrate rendered basic with 20% sodium hydroxide with cooling. The mixture is evaporated at ca 60°/15 mm. and the distillate collected. The residue is treated with water and again evaporated and the distillate collected. The distillate is rendered acidic with concentrated hydrochloric acid and concentrated to dryness in vacuo. The residue is rendered basic with 2 N sodium hydroxide and extracted several times with ether. The ether extracts are dried over magnesium sulfate and concentrated under vacuum. The product is then distilled, B.P. 162°, $n_D^{25} = 1.4482$.

(c) 3-(2 - methyl-6-ethylmorpholino)-1,2,8,9-tetraazaphenalene.—A mixture of 2-methyl-6-ethylmorpholine (25 g.), methyl Cellosolve (100 ml.) and 3-chloro-1,2,8,9-tetraazaphenalene hydrochloride (12 g.) is heated at reflux for 18 hours, then evaporated in vacuo. Water (400 cc.) is added to the residue and the mixture is cooled. The solid which forms is collected, washed with water and air dried to yield the product which is dissolved as well as possible in 2 N hydrochloric acid and filtered. The filtrate is rendered basic with 20% sodium carbonate solution and the solid which forms is collected, air dried and dissolved as well as possible in chloroform (250 ml.). This solution is warmed, clarified and filtered. The filtrate is concentrated at reduced pressure and the residue triturated with 5:1 benzene:dimethylformamide mixture (50 ml.). The yellow solid which forms is collected and recrystallized twice from benzene-hexane, with clarification, to yield the product, M.P. 168–172°.

EXAMPLE 17

3-(2-ethylmorpholino)-1,2,8,9-tetraazaphenalene

A mixture of 3-chloro-1,2,8,9-tetraazaphenalene hydrochloride (14.5 g.), 2-ethylmorpholine (21.8 g.) and methyl Cellosolve (150 ml.) is stirred at reflux for 20 hours. The material is concentrated to dryness under reduced pressure, triturated with water and cooled. The precipitate is collected, washed with cold water and dried. The solid is suspended in warm chloroform and filtered and the filtrate concentrated under reduced pressure. The solid is recrystallized twice from ethanol to afford the product, M.P. 206–210°.

EXAMPLE 18

3-(2-methylmorpholino)-1,2,8,9-tetraazaphenalene

A mixture of 3-chloro-1,2,8,9-tetraazaphenalene hydrochloride (12.05 g.), 2-methylmorpholine (15 g.) and methyl Cellosolve (100 ml.) is stirred at reflux under moisture exclusion for 18 hours and then concentrated at reduced pressure. The residue is stirred for three hours in water (250 ml.) with cooling. The solid which forms is collected, dried and dissolved as well as possible in chloroform (300 ml.). This solution is clarified and filtered. The filtrate is concentrated under reduced pressure and the residual solid is recrystallized from ethanol (450 ml.) with clarification to yield the free base, M.P. 225–228°.

This product is suspended in warm methanol (75 ml.), treated with methanesulfonic acid (2.2 g.) and filtered hot. The filtrate is treated with ether to incipient crystallization, cooled and the salt collected. The solid salt is recrystallized twice from methanol-ether to afford the pure product, M.P. 191–193° C.

EXAMPLE 19

3-(2,6-dimethyl-4-piperazinyl)-1,2,8,9-tetraazaphenalene

A mixture of 3-chloro-1,2,8,9-tetraazaphenalene hydrochloride (24.1 g.), 2,6-dimethylpiperazine (30 g.) and methyl Cellosolve (200 ml.) is stirred under reflux for 48 hours and then evaporated at reduced pressure. The residue is stirred in methanol (400 ml.) and cooled. The solid which forms is collected, washed with methanol, dried and dissolved in ethanol-methanol-water. The solid is removed by filtration and the filtrate is evaporated to dryness, triturated with ethanol. The solid thus collected is dissolved as well as possible in water (500 ml.) and filtered. The filtrate is rendered basic with 20% sodium carbonate solution and quickly extracted with chloroform. The chloroform extracts are evaporated at reduced pressure and the solid is recrystallized twice from methyl Cellosolve to yield the product, M.P. 268–270°.

What is claimed is:
1. A compound of the formula:

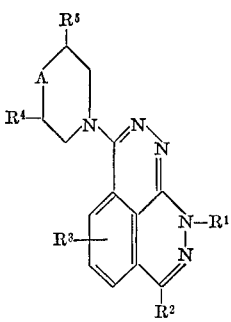

wherein
R¹ is hydrogen, (lower)alkyl, phenyl or phenyl-(lower)alkyl;
R² is hydrogen or phenyl;
R³ is hydrogen, chloro, bromo, hydroxy, (lower) alkoxy, carboxy or nitro;
each of R⁴ and R⁵, taken separately, is hydrogen or (lower)alkyl; and
A is O, NH, or N-alkyl.

2. The pharmaceutically acceptable non-toxic acid addition salts of a compound according to claim 1.
3. A compound according to claim 1 wherein A is oxygen.
4. The pharmaceutically acceptable non-toxic acid addition salts of a compound according to claim 3.
5. A compound according to claim 1 wherein A is NH or N-alkyl.
6. The pharmaceutically acceptable non-toxic acid addition salts of a compound according to claim 5.
7. The compound according to claim 1 wherein said compound is 3-morpholino-1,2,8,9-tetraazaphenalene.
8. The compound according to claim 1 wherein said compound is 3-morpholino-9-methyl - 1,2,8,9 - tetraazaphenalene.
9. The compound according to claim 1 wherein said compound is 3-morpholino-9-phenyl - 1,2,8,9 - tetraazaphenalene.
10. The compound according to claim 1 wherein said compound is 3-(2,6-dimethylmorpholino) - 9-methyl-1,2,8,9-tetraazaphenalene.
11. The compound according to claim 1 wherein said compound is 3-(2,6-dimethylmorpholino) - 9-phenyl-1,2,8,9-tetraazaphenalene.
12. The compound according to claim 1 wherein said compound is 3-(2,6-dimethylmorpholino)-9-phenyl-1,2,8,9-tetraazaphenalene.
13. The compound according to claim 1 wherein said compound is 3-(2,6 - dimethylmorpholino)-1,2,8,9-tetraazaphenalene.
14. The compound according to claim 1 wherein said compound is 3-N-(4-methylpiperazinyl)-9-methyl-1,2,8,9-tetraazaphenalene.
15. The compound according to claim 1 wherein said compound is 3-(4 - methylpiperazino) - 1,2,8,9 - tetrazaphenalene.
16. The compound according to claim 1 wherein said compound is 3-(2,6-diethylmorpholino)-1,2,8,9 - tetraazaphenalene.
17. The compound according to claim 1 wherein said compound is 3-(2 - ethyl-6-methylmorpholino) - 1,2,8,9-tetraazaphenalene.
18. The compound according to claim 1 wherein said compound is 3-(2 - ethylmorpholino) - 1,2,8,9 - tetraazaphenalene.
19. The compound according to claim 1 wherein said compound is 3-(2 - methylmorpholino)-1,2,8,9-tetraazaphenalene.
20. The compound according to claim 1 wherein said compound is 3-(2,6 - dimethylpiperazino)-1,2,8,9 - tetraazaphenalene.

References Cited
UNITED STATES PATENTS

| | | | |
|---|---|---|---|
| 3,422,105 | 1/1969 | Doebel et al. | 260—250A |
| 3,429,882 | 2/1969 | Doebel et al. | 260—250A |

NICHOLAS S. RIZZO, Primary Examiner

U.S. Cl. X.R.
260—250; 424—250

UNITED STATES PATENT OFFICE
CERTIFICATE OF CORRECTION

Patent No. 3,562,268     Dated February 9, 1971

Inventor(s) Karl J. Doebel and John E. Francis

It is certified that error appears in the above-identified patent and that said Letters Patent are hereby corrected as shown below:

Column 3 Formula V - 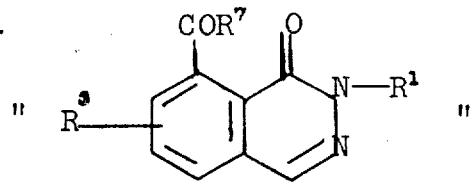 "

should read

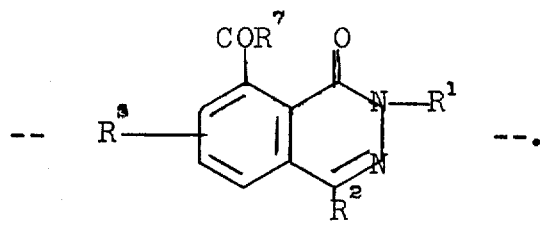 --.

Column 4 line 7 - "(1500 ml. is irradiated and heated ti re-' should read -- (1500 ml.) is irradiated and heated to re- --.

Column 6 line 28 - "M.P. 277-288° C." should read -- M.P. 278. C. --.

Column 6 line 32 - "3-keto-5-benzyl-2,3-dihydro-1,2,8,9-tetra- should read -- 3-keto-9-benzyl-2,3-dihydro-1,2,8,9-tetra- --.

Signed and sealed this 28th day of March 1972.

(SEAL)
Attest:

EDWARD M. FLETCHER, JR.     ROBERT GOTTSCHALK
Attesting Officer     Commissioner of Patents